(12) United States Patent
Ruff et al.

(10) Patent No.: US 12,276,481 B1
(45) Date of Patent: Apr. 15, 2025

(54) BULLET TRACKER FOR AIMING REMOTE CONTROLLED WEAPON SYSTEMS

(71) Applicant: U.S. Army DEVCOM, Army Research Laboratory, Adelphi, MD (US)

(72) Inventors: William C. Ruff, Catonsville, MD (US); Joshua T. Dillon, Huntsville, AL (US); Julius Marcus, Vienna, VA (US); David R. Anderson, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/540,969

(22) Filed: Dec. 15, 2023

(51) Int. Cl.
*F41G 3/14* (2006.01)
*F41G 3/16* (2006.01)
*F41G 5/06* (2006.01)

(52) U.S. Cl.
CPC .......... *F41G 3/142* (2013.01); *F41G 3/165* (2013.01); *F41G 5/06* (2013.01); *F41G 3/147* (2013.01)

(58) Field of Classification Search
CPC .......... F41G 3/142; F41G 3/147; F41G 3/165; F41G 5/06

USPC .......................................... 235/404
See application file for complete search history.

(56) References Cited

U.S. PATENT DOCUMENTS

| 12,007,203 | B1* | 6/2024 | Archer | F41G 3/145 |
| 2006/0021498 | A1* | 2/2006 | Moroz | F41G 3/147 |
| | | | | 89/41.06 |
| 2011/0315767 | A1* | 12/2011 | Lowrance | F41G 3/02 |
| | | | | 235/404 |
| 2017/0357002 | A1* | 12/2017 | Winker | G01S 17/10 |

FOREIGN PATENT DOCUMENTS

CN       112200838 A  *  1/2021  ............. G06T 5/003

* cited by examiner

*Primary Examiner* — Laura A Gudorf
(74) *Attorney, Agent, or Firm* — Alan I. Kalb

(57) ABSTRACT

A bullet tracking system comprising a sensor sub-system that generates bullet tracking data by tracking a position and range of a bullet discharged from a remote-controlled weapon and traveling to an intended target; a processor that processes the bullet tracking data to determine aim adjustments of the weapon for subsequent firing of bullets to compensate for tracked bullet ballistics to improve an accuracy of the bullets for reaching the intended target; and a control sub-system to make the aim adjustments of the weapon.

10 Claims, 9 Drawing Sheets

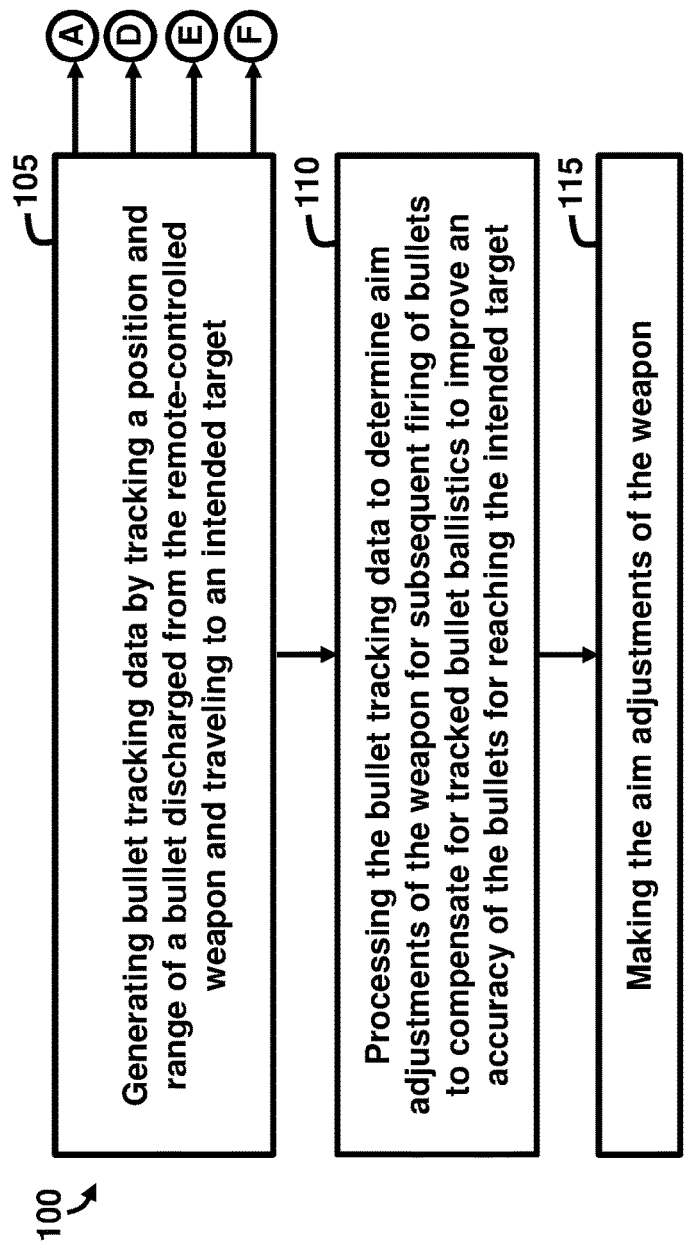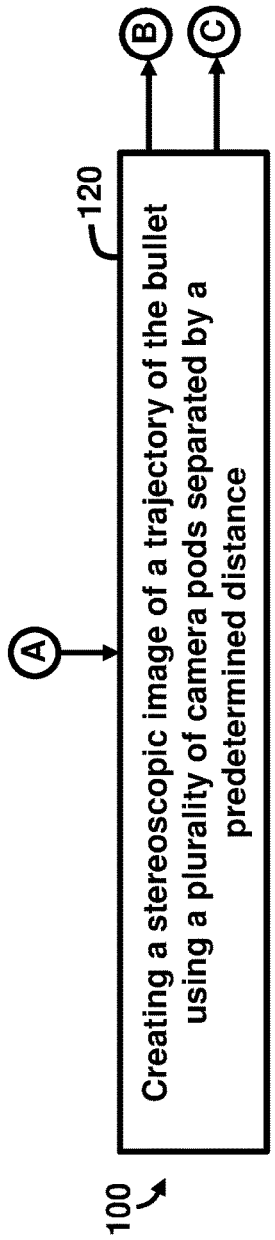

FIG. 6C

125 — Identifying bullet trajectory inaccuracy for long and short-range targets using the bullet tracking cameras having overlapping fields of view

FIG. 6D

130 — Using spectral filtering to reduce false alarm detections of inaccurate positional detection of the bullet

FIG. 6E

135 — Performing near real-time correction calculations for bullet trajectories and camera synchronization Using a computer stereo vision camera for tracking the trajectory of the bullet — 140

Displaying a lateral offset position of the bullet from a cross-hair location provided by the weapon — 145

BULLET TRACKER FOR AIMING REMOTE CONTROLLED WEAPON SYSTEMS

GOVERNMENT INTEREST

The embodiments herein may be manufactured, used, and/or licensed by or for the United States Government without the payment of royalties thereon.

BACKGROUND

Technical Field

The embodiments herein generally relate to weapons systems, and more particularly to munition trajectory diagnostic systems.

Description of the Related Art

This background description includes information that may be useful in understanding the present invention. It is not an admission that any of the information provided herein is prior art or relevant to the presently claimed invention or that any publication specifically or implicitly referenced is prior art.

Adversaries are increasingly converting small drones into weapons platforms which, if used singly or in swarms, can quickly overwhelm during an engagement and increase the lethality of the attack. A weapon's fire accuracy must increase significantly to counter this threat. Soldier survivability on the battlefield requires engaging threats before the situation turns lethal. Small units require every advantage when engaged in a firefight to achieve local tactical overmatch and limit friendly and civilian causalities. Remotely operated weapons can provide this advantage by using external sensors to automatically cue the weapon operator to emerging threats. The U.S. Army has recently deployed a hostile fire detection locating and cueing system for just this purpose. Once cued, the weapon operator uses the existing visible and infrared (IR) weapon sight cameras to locate and fix the enemy with return fire. Unfortunately, small drone targets are difficult to fix using the existing weapon sight optics and the bullet dispersion due to windage and other ballistic effects make them difficult to hit at a nominally effective range. These factors allow the drones to get exceedingly close to the unit before it can be effectively engaged which can have devastatingly lethal effects during a battle. Without cues to the accuracy of a weapon's hit on a target, responses to every weapon's fire event severely limits the utility of the surveillance during a firefight.

SUMMARY

In view of the foregoing, an embodiment herein provides a bullet tracking system comprising a sensor sub-system that generates bullet tracking data by tracking a position and range of a bullet discharged from a remote-controlled weapon and traveling to an intended target; a processor that processes the bullet tracking data to determine aim adjustments of the weapon for subsequent firing of bullets to compensate for tracked bullet ballistics to improve an accuracy of the bullets for reaching the intended target; and a control sub-system to make the aim adjustments of the weapon.

The sensor sub-system may comprise a plurality of camera pods separated by a predetermined distance to create a stereoscopic image of a trajectory of the bullet. Each camera pod may comprise a high-resolution color spotting camera and high, mid, and low-resolution bullet tracking cameras. The bullet tracking cameras may have overlapping fields of view to identify bullet trajectory inaccuracy for long and short-range targets. The bullet tracking cameras may use spectral filtering to reduce false alarm detections of inaccurate positional detection of the bullet. The sensor sub-system may perform near real-time correction calculations for bullet trajectories and camera synchronization. The sensor sub-system may comprise a computer stereo vision camera. The system may comprise a display device that displays a lateral offset position of the bullet from a cross-hair location provided by the weapon.

Another embodiment provides a method for tracking a bullet discharged from a remote-controlled weapon, the method comprising generating bullet tracking data by tracking a position and range of a bullet discharged from the remote-controlled weapon and traveling to an intended target; processing the bullet tracking data to determine aim adjustments of the weapon for subsequent firing of bullets to compensate for tracked bullet ballistics to improve an accuracy of the bullets for reaching the intended target; and making the aim adjustments of the weapon.

The method may comprise creating a stereoscopic image of a trajectory of the bullet using a plurality of camera pods separated by a predetermined distance. Each camera pod may comprise a high-resolution color spotting camera and high, mid, and low-resolution bullet tracking cameras. The method may comprise identifying bullet trajectory inaccuracy for long and short-range targets using the bullet tracking cameras having overlapping fields of view. The method may comprise using spectral filtering to reduce false alarm detections of inaccurate positional detection of the bullet. The method may comprise performing near real-time correction calculations for bullet trajectories and camera synchronization. The method may comprise using a computer stereo vision camera for tracking the trajectory of the bullet. The method may comprise displaying a lateral offset position of the bullet from a cross-hair location provided by the weapon.

Another embodiment provides a computer-readable medium storing instructions for tracking a bullet discharged from a remote-controlled weapon, the instructions comprising generating bullet tracking data by tracking a position and range of a bullet discharged from the remote-controlled weapon and traveling to an intended target; processing the bullet tracking data to determine aim adjustments of the weapon for subsequent firing of bullets to compensate for tracked bullet ballistics to improve an accuracy of the bullets for reaching the intended target; and making the aim adjustments of the weapon. The instructions may comprise creating a stereoscopic image of a trajectory of the bullet. The instructions may comprise using spectral filtering to reduce false alarm detections of inaccurate positional detection of the bullet. The instructions may comprise displaying a lateral offset position of the bullet from a cross-hair location provided by the weapon.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6A is a flow diagram illustrating a method for tracking a bullet discharged from a remote-controlled weapon, according to an embodiment herein;

FIG. 6B is a flow diagram illustrating a method of creating an image, according to an embodiment herein;

FIG. 6C is a flow diagram illustrating a method of identifying bullet trajectories, according to an embodiment herein;

FIG. 6D is a flow diagram illustrating a method of reducing false alarm detections, according to an embodiment herein;

FIG. 6E is a flow diagram illustrating a method of performing correction calculations, according to an embodiment herein;

Figure 1:
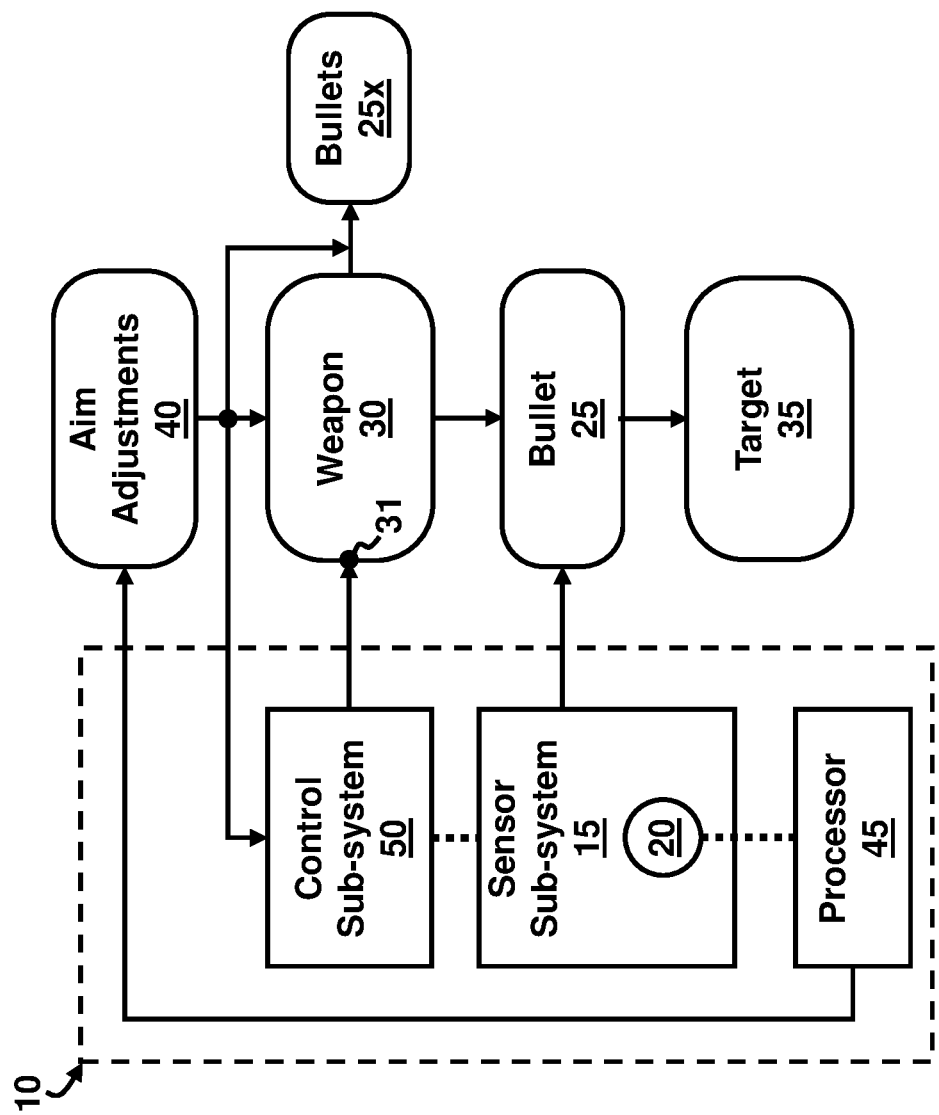
FIG. 1 is a block diagram illustrating a bullet tracking system, according to an embodiment herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. The following description of particular embodiment(s) is merely exemplary in nature and is in no way intended to limit the scope of the invention, its application, or uses, which can, of course, vary.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrates the best mode of practicing the embodiments herein. Upon reading the following description in light of the accompanying drawing figures, those skilled in the art will understand the concepts of the disclosure and will recognize applications of these concepts not particularly addressed herein.

The terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/or" includes any and all combinations of one or more of the associated listed items.

Furthermore, although the terms "final", "first", "second", "upper", "lower", "bottom", "side", "intermediate", "middle", and "top", etc. may be used herein to describe various elements, but these elements should not be limited by these terms. These terms are only used to distinguish one element from another. For example, a first element could be termed an "top" element and, similarly, a second element could be termed a "top" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

The embodiments herein provide a sensor system into a remote weapon system to track bullet position and automatically adjust the weapon to compensate for bullet ballistics. This can drastically increase weapon lethality against small targets at long range and greatly increase the survivability and effectiveness of the warfighter. Field test data shows successful bullet tracking out to 600 m with projected tracking out to a km or better. Referring now to the drawings, and more particularly to FIGS. 1 through 8, where similar reference characters denote corresponding features consistently throughout the figures, there are shown preferred embodiments. In the drawings, the size and relative sizes of components, layers, and regions, etc. may be exaggerated for clarity.

FIG. 1 illustrates a bullet tracking system 10 comprising a sensor sub-system 15 that generates bullet tracking data 20 by tracking a position and range of a bullet 25 discharged from a remote-controlled weapon 30 and traveling to an intended target 35. The system 10 further comprises a processor 45 that processes the bullet tracking data 20 to determine aim adjustments 40 of the weapon 30 for subsequent firing of bullets 25x to compensate for tracked bullet ballistics to improve an accuracy of the bullets 25x for reaching the intended target 35. The system 10 further comprises a control sub-system 50 to make the aim adjustments 40 of the weapon 30.

The bullet tracking system 10 is a sophisticated technological solution configured to enhance the accuracy of bullets 25x fired from a remote-controlled weapon 30 such as a machine gun, or a weapon system such as missiles, drones, UAVs, etc. The remote-controlled weapon 30 can be controlled up to two kilometers from the actual weapon emplacement. This separation completely isolates the gunner from the weapon 30. The sensor sub-system 15 is the foundational element of the bullet 25 tracking system. The sensor sub-system 15 is responsible for capturing real-time data 20 related to the bullet 25 in flight. The sensor sub-system 15 utilizes advanced sensor technologies, such as radar, lidar, and optical sensors, to continuously monitor and track the position and range of the bullet 25 and subsequent bullets 25x as they are discharged from the remote-controlled weapon 30 and travel towards their intended target 35. The sensor sub-system 15 can detect the bullet 25 at various stages of its trajectory 27, from the moment the bullet 25 leaves the barrel to the point of impact or termination. The sensor sub-system 15 can capture information about the speed, direction, and relative position of the bullet 25 to the muzzle of the weapon 30 and to the intended target 35.

The processor 45 is tasked with analyzing and processing the bullet tracking data 20 collected by the sensor sub-system 15. This processing stage is used for making precise aim adjustments 40 to compensate for bullet ballistics. The processor 45 employs advanced algorithms to calculate a wide range of parameters, including bullet velocity, flight path, and potential deviations caused by factors like wind, temperature, and gravity. These algorithms may involve complex mathematical models and simulations to predict the future position of the bullet 25, enabling the processor 45 to accurately predict and adjust the aim of the weapon 30 for the next shot.

The control sub-system 50 is responsible for translating the calculated aim adjustments 40 generated by the processor 45 into real-time weapon control. The control sub-system 50 interfaces with the aiming mechanism 31 of the remote-controlled weapon 30 and adjusts parameters such as elevation, azimuth, and firing timing to ensure that subsequent bullets 25x are fired with improved accuracy. The control sub-system 50 may employ mechanical or electronic actuators (not shown) to physically move and orient the barrel of the weapon 30, aligning the aiming mechanism 31 of the weapon 30 with the calculated aim adjustments 40.

The sensor sub-system 15 is an integral part of a sophisticated weapon system such as weapon 30. The sensor sub-system 15 is configured to provide precise monitoring and correction of bullet trajectories 27 in real-time. As further described below with reference to FIGS. 2A through 5, the sensor sub-system 15 leverages a combination of advanced camera pods 55, spectral filtering techniques, and complex data processing algorithms to ensure the accuracy of bullet tracking and targeting.

Figure 2B:
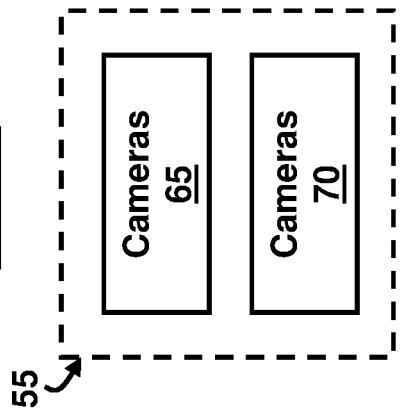
FIG. 2B is a block diagram illustrating an example of a camera pod, according to an embodiment herein.
Figure 2A:
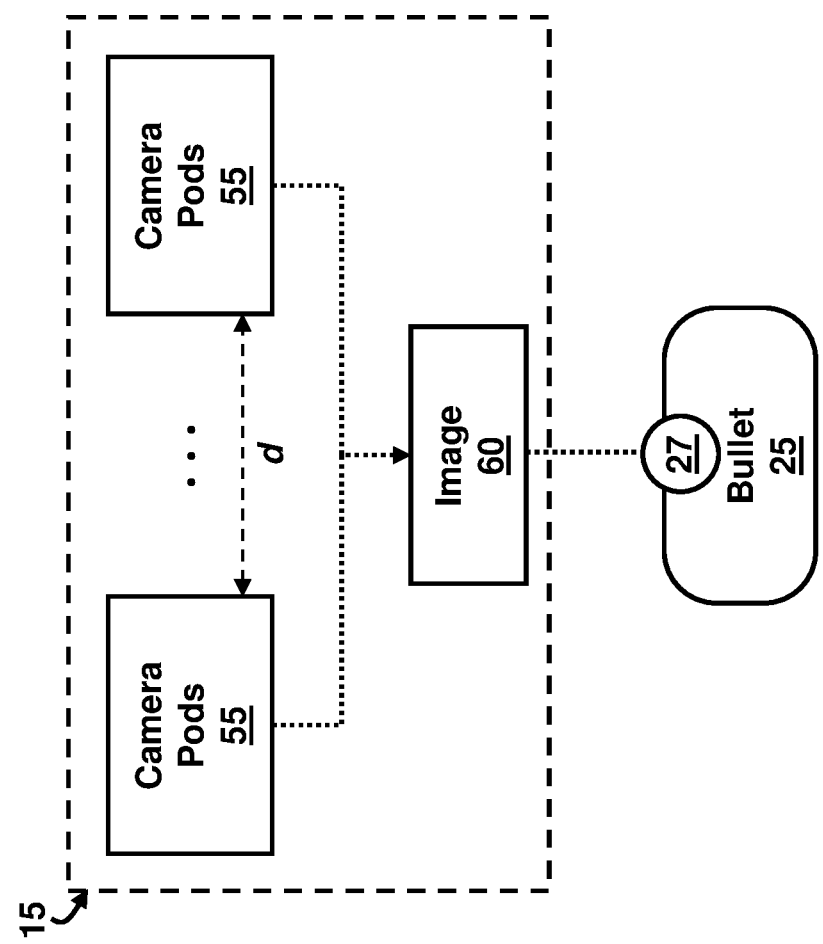
FIG. 2A is a block diagram illustrating an example of the sensor sub-system, according to an embodiment herein.

As shown in FIG. 2A, with reference to FIG. 1, the sensor sub-system 15, which may be operated in either static or controlled gimbal configuration, may comprise a plurality of camera pods 55 separated by a predetermined distance d to create a stereoscopic image 60 of a trajectory 27 of the bullet 25. As such, the sensor sub-system 15 features multiple camera pods 55 distributed at specific intervals along the line of sight of the weapon 30. These camera pods 55 are strategically placed to create the stereoscopic image 60 of the trajectory 27 of the bullet 25. By having multiple pods 55, the sensor sub-system 15 can capture different angles and perspectives of the path of the bullet 25, enabling accurate calculations of the trajectory 27 of the bullet 25.

The stereoscopic image 60 allows for a more realistic and immersive visualization of the bullet 25, trajectory 27 of the bullet 25, and other objects and scenes in three dimensions. The stereoscopic image 60 enhances the depth perception of the viewer, making it easier to understand spatial relationships and improve the overall visual experience. The stereoscopic image 60 is a type of image 60 that is created to mimic the three-dimensional perception of depth and dimension that human visual system experiences naturally. The stereoscopic image 60 is provided to give the viewer the illusion of depth by presenting two slightly different views of the same scene, just as a human's two eyes perceive the world from slightly different angles. These two views are referred to as the "left-eye" and "right-eye" perspectives.

The process of creating the stereoscopic images, also referred to as stereoscopy, is based on the principle of binocular disparity. This means that when each eye sees a slightly different perspective of an object or scene, the brain combines these two views to create a perception of depth. The brain's ability to interpret these disparities allows us to gauge the distance and spatial relationships between objects. Accordingly, the multiple camera pods 55 mimic this principle of binocular disparity to generate the stereoscopic image 60.

According to the embodiments herein, the stereoscopic image 60 can be generated through various methods, including but not limited to stereoscopic photography created by the camera pods 55, whereby two photographs of the same subject (e.g., bullet 25 or trajectory 27 of the bullet 25) are taken from slightly different angles, simulating the spacing between a person's eyes. When combined, the images merge, creating the illusion of depth. Alternatively, the stereoscopic image 60 can be created using stereoscopic displays such as 3D computer monitors or 3D TVs. These displays use various techniques, like active shutter glasses or auto-stereoscopic screens, to deliver separate images to each eye, creating a three-dimensional effect. Still alternatively, the stereoscopic image 60 can be created using virtual reality (VR) and augmented reality (AR) that use stereoscopy to present different images to each eye, which creates a sense of depth and immersion when the user interacts with a virtual or augmented environment.

As shown in FIG. 2B, with reference to FIGS. 1 and 2A, each camera pod 55 may comprise a high-resolution color spotting camera 65 and high, mid, and low-resolution bullet tracking cameras 70. For example, the high-resolution color spotting camera 65 may capture detailed images of the target 35 and the bullet 25 in flight, providing a clear visual reference for trajectory analysis of the bullet 25. According to an example, the high, mid, and low-resolution bullet tracking cameras 70 may work in unison to monitor the trajectory 27 of the bullet 25 as well as the movement of the bullet 25, in general, at different levels of visual detail.

The bullet tracking cameras 70 may have overlapping fields of view to identify bullet trajectory inaccuracy for long and short-range targets. This aspect of the bullet tracking cameras 70 ensures that the system 10 can accurately detect and measure the trajectory 27 of the bullet 25, even for targets 35 at varying distances, both short and long-range. By overlapping the fields of view, the system 10 can cross-reference data and identify any trajectory inaccuracies.

The bullet tracking cameras 70 may use spectral filtering to reduce false alarm detections of inaccurate positional detection of the bullet 25. This technique helps differentiate the bullet 25 from other objects and atmospheric disturbances by analyzing the spectral characteristics of the bullet 25, including chemical composition and discharge. Furthermore, the use of spectral filtering helps reduce the likelihood of erroneously identifying non-bullet objects as part of the trajectory 27.

According to an example, the sensor sub-system 15 may comprise two, four camera pods 55 separated by 4 m, for example (although other suitable distances d may be used), to form the stereoscopic image 60 of the bullet 25 during its trajectory 27. Each pod 55 contains a high-resolution color spotting camera 65 and high (0.003 deg/0.05 mRad IFOV), mid (0.005 deg/0.09 mRad IFOV), and low resolution (0.02 deg/0.4 mRad IFOV) bullet tracking cameras 70. The multiple bullet tracking cameras 70 are configured to have different, overlapping fields of view to handle large bullet inaccuracy for long and short range targets 35. Moreover, the cameras' FOV, field of regard (FOR), frame rate, and integration time can be changed "on the fly", in real-time, using suitable software.

Figure 3:
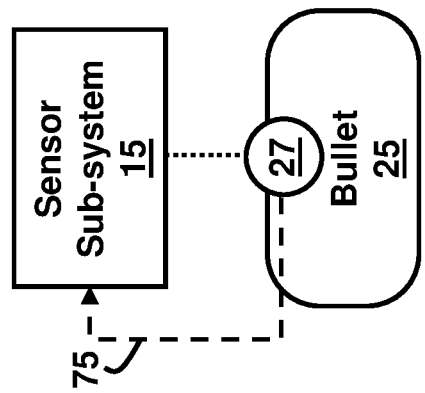
FIG. 3 is a block diagram illustrating an aspect of the sensor sub-system, according to an embodiment herein.

As shown in FIG. 3, with reference to FIGS. 1 through 2B, the sensor sub-system 15 may perform near real-time correction calculations 75 for bullet trajectories 27 and camera synchronization. As such, the sensor sub-system 15 continuously analyzes the data 20 from the camera pods 55 and calculates the in-flight trajectory 27 of the bullet 25. If any deviation from the intended path is detected, the system 10 can automatically adjust the aim of the weapon 30 or provide feedback to the shooter for manual correction.

Figure 4:
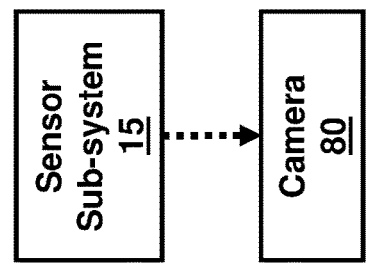
FIG. 4 is a block diagram illustrating another aspect of the sensor sub-system, according to an embodiment herein.

As shown in FIG. 4, with reference to FIGS. 1 through 3, the sensor sub-system 15 may comprise a computer stereo vision camera 80. This camera 80 is responsible for processing the stereoscopic images 60 captured by the camera pods 55 and performing depth perception calculations. The data 20 generated by the camera 80 helps to accurately determine the three-dimensional trajectory 27 of the bullet 25. The camera 80 may be the same as those provided in the camera pods 55, in an example.

According to some examples, the cameras 65, 70, 80, which operate at high speed at approximately 1,000 frames per second for terrestrial applications and 350 frames per second for airborne applications, are able to sample and detect the weapons flash from large weapon systems such as rocket propelled grenades (RPG). The sensor sub-system 15 may also be configured to identify a specific spectral signature to help separate the weapons flash from background clutter present in the image. Furthermore, the high camera frame rate allows the position of the bullet 25 to be measured frequently on its way to the target 35 and the spectral filtering can be utilized to significantly reduce false alarm detections.

Figure 5:
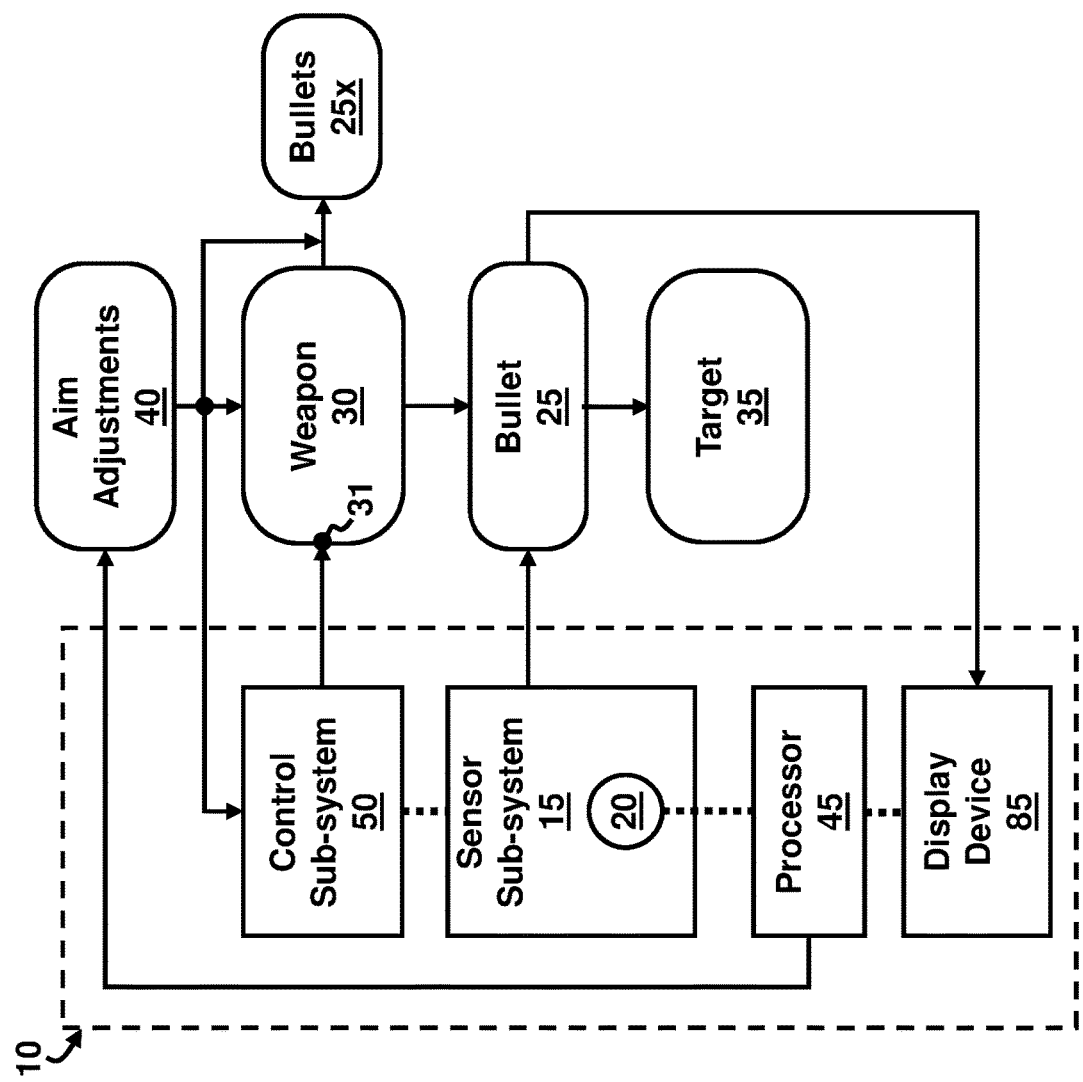
FIG. 5 is a block diagram illustrating a display device, according to an embodiment herein.

As shown in FIG. 5, with reference to FIGS. 1 through 4, the system 10 may comprise a display device 85 that displays a lateral offset position of the bullet 25 from a cross-hair location provided by the weapon 30. Accordingly, the display device 85 provides real-time feedback to the shooter, showing the lateral offset position of the bullet 25 from the intended cross-hair location provided by the aiming system (not shown) of the weapon 30. This feedback enables the shooter to make precise adjustments to their aim, ensuring that the subsequent bullets $25x$ hit the target 35 accurately. Alternatively, this feedback allows for automatic barrel compensation to place the bullet 25 through the weapon sight crosshair location at the target range. This can greatly reduce the gunner's workload since this aim adjustment 40 occurs automatically.

Figure 6F:
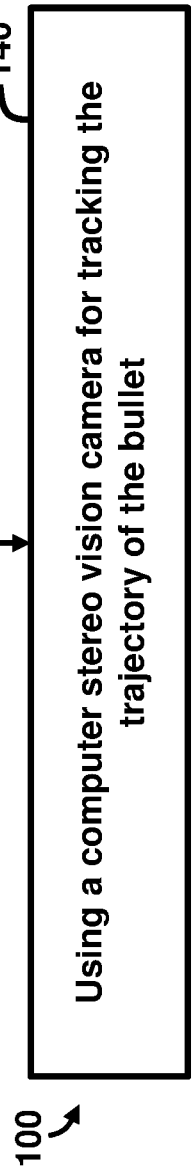
FIG. 6F is a flow diagram illustrating a method of tracking the trajectory of a bullet, according to an embodiment herein.

FIGS. 6A through 6G, with reference to FIGS. 1 through 5, are flow diagrams illustrating a method 100 for tracking a bullet 25 discharged from a remote-controlled weapon 30. As shown in FIG. 6A, the method 100 comprises generating (105) bullet tracking data 20 by tracking a position and range of a bullet 25 discharged from the remote-controlled weapon 30 and traveling to an intended target 35; processing (110) the bullet tracking data 20 to determine aim adjustments 40 of the weapon 30 for subsequent firing of bullets $25x$ to compensate for tracked bullet ballistics to improve an accuracy of the bullets $25x$ for reaching the intended target 35; and making (115) the aim adjustments 40 of the weapon 30.

A generalized algorithm for practicing the method 100 involves the following stages beginning when the bullet 25 is discharged from the remote-controlled weapon 30. Next, bullet tracking data 20 is generated by tracking the position and range of the bullet 25 as it travels to the intended target 35. Next, the tracking data 20 is processed, which includes calculating ballistic parameters (e.g., velocity, trajectory 27, etc.), applying wind and other environmental corrections, and adjusting elevation based on the collected data 20. The processed data 20 is used to determine the aim adjustments 40 required to compensate for the bullet's ballistics and improve the accuracy for subsequently fired bullets $25x$ reaching the intended target 35. Thereafter, the aim adjustments 40 are applied to the remote-controlled weapon 30, ensuring that the subsequent bullets $25x$ are fired with improved accuracy.

The bullet tracking system 10 operates in a closed feedback loop. As each bullet 25 is fired, the sensor sub-system 15 tracks the movement of the bullet 25 and collects pertinent data 20. This data 20 is then transmitted to the processor 45 in real-time for analysis. The processor 45 uses the gathered information to compute aim adjustments 40 for the weapon 30, accounting for the trajectory 27 of the bullet 25 and external environmental conditions. The control subsystem 50 receives these aim adjustments 40 and translates them into precise changes in the orientation and firing parameters of the weapon 30, ensuring that the next bullets 25x are fired with increased accuracy. This iterative process continues for each of the subsequent bullets 25x, with continuous monitoring and adjustment, ultimately resulting in a sequence of shots that progressively increase in accuracy until the intended target 35 is reached.

As shown in FIG. 6B, the method 100 may comprise creating (120) a stereoscopic image 60 of a trajectory 27 of the bullet 25 using a plurality of camera pods 55 separated by a predetermined distance d. Each camera pod 55 may comprise a high-resolution color spotting camera 65 and high, mid, and low-resolution bullet tracking cameras 70. The high-resolution color spotting camera 65 is a specialized imaging device designed to capture detailed, high-quality color photographs or videos of specific objects including the bullet 25, the trajectory 27 of the bullet 25, surrounding scenes, and events corresponding to the trajectory 27 of the bullet 25. Enhanced optical components play a pivotal role in the functionality of the camera 65. Equipped with a high-quality lens system, the camera 65 focuses incoming light onto an image sensor, determining essential factors like the field of view, depth of field, and image sharpness. The high-resolution color spotting camera 65 may also utilize advanced image sensors, such as CCD (Charge-Coupled Device) or CMOS (Complementary Metal-Oxide-Semiconductor) sensors, which help capture color information with high detail and fidelity.

In terms of color sensing, the camera 65 utilizes a Bayer filter pattern, placed over the image sensor, separates incoming light into its red, green, and blue (RGB) components, with each pixel recording one of these color channels. Light sensitivity can be controlled through adjustable ISO settings, which dictate the sensitivity to light of the camera 65. Higher ISO settings are employed in low-light conditions to capture images of the bullet 25 with less noise, though they may marginally reduce color accuracy and detail.

Exposure control mechanisms further enhance the capabilities of the camera 65. Shutter speed determines the duration the image sensor is exposed to light, facilitating the capture of fast-moving objects or the creation of artistic effects. The aperture setting of the camera 65 regulates the amount of light entering the lens, influencing the depth of field and its performance under varying lighting conditions. In terms of image processing, the camera 65 may incorporate image signal processors (ISPs) to process and enhance raw image data, performing tasks such as noise reduction, color correction, and sharpness adjustments. Furthermore, color calibration processes ensure precise color reproduction. For storage and output, the camera 65 saves captured images or videos in various formats, including JPEG, TIFF, or RAW, facilitating transfer to external devices or storage on internal memory cards. Connectivity options such as USB, Wi-Fi®, Bluetooth®, Ethernet, or any secured transfer of data method may also be utilized to transfer data to computers or other devices, including to cloud storage. To aid users in composing and framing their shots, the camera 65 may have a viewfinder or an LCD screen.

Users exercise control over various camera settings, including focus, exposure, white balance, and color modes, enabling them to customize the appearance of captured images or videos of the bullet 25 and the trajectory 27 of the bullet 25 and surrounding scenes. Accordingly, the high-resolution color spotting camera 65 leverages advanced optics, sensors, and image processing techniques to capture high-quality, detailed color photographs or videos of the bullet 25, etc. The adaptability and versatility of the camera 65 render it suitable for a broad spectrum of image capturing requirements of the bullet 25 where precision and clarity are of paramount importance.

The high-resolution, mid-resolution, and low-resolution cameras 70 are distinct types of imaging devices, each possessing unique capabilities for capturing and rendering visual information with varying levels of detail and clarity. They cater to specific needs according to the desired image quality of the bullet 25 in flight. With an emphasis on resolution, the high-resolution cameras are configured to seize images or videos with an exceptional level of detail. The high-resolution camera includes a substantial number of pixels on their image sensors, typically ranging from 12 to over 100 megapixels, and thus are primed for high image resolution of the bullet 25 in flight. The high-resolution camera further includes image sensors with an extensive pixel count and integrates sophisticated technologies such as back-illuminated CMOS or CCD sensors. These sensors are adept at acquiring the visual data 20 of the bullet 25, which translates into finely detailed images of the bullet 25. Furthermore, supported by enhanced optics that encompass high-quality lenses and precision optical components, the high-resolution cameras guarantee the optimal capture and transmission of intricate details of the bullet 25. The inclusion of advanced image processing algorithms and color management further enhances the quality of the captured data 20.

The mid-resolution camera strikes a balance between its high and low-resolution counterparts and may include a pixel count that typically falls within the range of 5 to 12 megapixels. This balance hinges on providing good image quality while mitigating concerns over unwieldy file sizes. Equipped with image sensors having a moderate pixel count, they ensure that image quality remains commendable without inundating storage with large files. While the mid-resolution camera may not boast the optical precision characteristic of the high-resolution camera, they generally come with reliable lenses. Image processing in the mid-resolution camera is tailored to maintain a harmonious equilibrium between detail and file size.

The low-resolution camera, in contrast, is configured to capture images and videos of the bullet 25 with a restricted degree of detail. With fewer pixels on their image sensors, often yielding resolutions less than 5 megapixels, the low-resolution camera delivers images with reduced detail. These cameras employ image sensors characterized by a lower pixel count, a factor that curtails the level of detail they can capture. Their optics may be more rudimentary or compact in nature, trading complexity for simplicity. Image processing in low-resolution cameras is geared more towards conserving file size rather than fine-tuning image quality of the bullet 25. The low-resolution camera is beneficial for capturing the surrounding scenes and environment of the bullet 25 and target 35. In another example, the resolutions of the various cameras 70 may be changed by modifying the field of view.

As shown in FIG. 6C, the method 100 may comprise identifying (125) bullet trajectory inaccuracy for long and short-range targets using the bullet tracking cameras 70 having overlapping fields of view. The overlapping field of view pertains to a specific arrangement of multiple imaging devices or sensors, such as the camera pods 55 and the corresponding cameras 65, 70 such that their respective fields of view intersect or overlap with one another. In this configuration, the two or more cameras 65, 70 are strategically positioned so that their fields of view span the same or partially overlapping areas within the observed space, a placement tailored to meet the precise needs of capturing a complete view of the bullet 25 and the trajectory 27 of the bullet 25 as well as further requirements of the system 10.

Creating overlapping fields of view significantly enhances spatial coverage of the observed area of the bullet 25 in flight including the target 35. With multiple cameras 65, 70 concurrently capturing data 20 from the same region, the sensor sub-system 15 can acquire a lot of data 20 about the bullet 25 in flight or events within the scene surrounding the trajectory 27 of the bullet 25 and the target 35. Redundancy is ensured as the overlapping fields of view captured by the cameras 65, 70 can compensate for the loss of data 20 should one camera fail or encounter issues, thereby sustaining overall effective system function. Moreover, the accuracy and precision of data collection and bullet tracking are significantly heightened with the overlapping fields of view, as data 20 from multiple cameras 65, 70, acquired from varying perspectives, simplifies the triangulation of bullet 25 positions in the observed space. Blind spots in the observation area are notably diminished or even eradicated, with overlapping fields of view effectively mitigating any potential limitations in the field of vision of individual cameras 65, 70.

As shown in FIG. 6D, the method 100 may comprise using (130) spectral filtering to reduce false alarm detections of inaccurate positional detection of the bullet 25. Spectral filtering is a versatile technique and plays a pivotal role in selectively manipulating or extracting specific wavelengths or spectral components from the vast electromagnetic radiation spectrum. This process is indispensable to providing a good image 60 of the bullet 25, encompassing tasks like enhancing image quality, isolating particular features of the trajectory 27 of the bullet 25, and minimizing noise. The electromagnetic spectrum encompasses a myriad of electromagnetic radiation forms, including visible light, infrared, ultraviolet, and more. Spectral filtering zeroes in on isolating specific segments of this extensive spectrum. This precision is achieved by employing an array of optical and electronic components, ranging from filters and gratings to prisms and sensors configured as part of, or in addition to, the camera 70. These components selectively transmit or block certain wavelengths of light or other electromagnetic radiation, a fundamental mechanism that underpins spectral filtering.

In practice, spectral filtering unfolds in a systematic manner. It commences with the selection of target wavelengths or spectral bands, an initial step contingent upon the particular application's unique demands. The crux of spectral filtering lies in a filtering device, often taking the form of a filter, strategically positioned in the optical path of electromagnetic radiation. This filter, which is part of, or connected to, the camera 70, is configured to interact differently with diverse wavelengths or spectral components, delivering specific filtering outcomes. There are types of spectral filters, which may be used:

Narrowband Filters—These filters transmit an exceptionally narrow range of wavelengths, effectively isolating a precise spectral band.

Broadband Filters—In contrast, broadband filters permit a broader range of wavelengths to pass while concurrently blocking others.

Interference Filters—These filters cleverly leverage the principles of interference to selectively transmit or reflect particular wavelengths.

Dichroic Filters—Distinguished by their variable spectral transmission and reflection properties, dichroic filters accommodate intricate filtering requirements.

Key to spectral filtering are filter characteristics, including parameters like center wavelength, bandwidth, and transmittance, all meticulously calibrated to exercise precise control over the spectral filtering process. These filters can be strategically placed within the optical path of the camera 70, which captures the electromagnetic radiation in the captured scene. The strategic placement of the camera 70 and filters ensures that only the desired wavelengths or spectral components are permitted to pass through, while others are effectively blocked or absorbed, aligning with the defined filtering objectives. Accordingly, spectral filtering enables the selective manipulation of electromagnetic radiation, offering solutions to a broad array of challenges in tracking the bullet 25 and enhancing the quality and precision of the captured data 20.

As shown in FIG. 6E, the method 100 may comprise performing (135) near real-time correction calculations 75 for bullet trajectories 27 and camera synchronization. Performing near real-time correction calculations for bullet trajectories 27 and camera synchronization is a critical aspect of advanced weapon systems and shooting accuracy of the weapon 30. These calculations help ensure that the subsequent bullets 25$x$ hits the intended target 35. In an example, the real-time correction calculations 75 can be achieved using an iterative process this. First, the process may involve data acquisition. Here, the bullet trajectory data 20 is collected from the various cameras 65, 70 in the sensor sub-system 15, including information about the initial trajectory 27, speed, and orientation of the bullet 25. Next, data 20 is gathered from the camera pods 55, including a current position and orientation of the bullet 25, and the time stamps of each captured frame. Next, camera synchronization occurs. First, the cameras 65, 70 are all synchronized in terms of time. This aligns the data 20 from the different sources accurately. Then, it is verified that all cameras 65, 70 share a common coordinate system. This alignment helps to correctly interpret the data 20 from the various sources (e.g., cameras 65, 70).

Thereafter, data preprocessing occurs. First, any distortions or inaccuracies in the camera data 20 is corrected through calibration processes. This ensures that the images 60 accurately represent the scene surrounding the trajectory 27 of the bullet 25 and the target 35. Next, noise reduction techniques are applied to minimize interference, noise, or aberrations in the data 20. Then, the data 20 is correlated from the different cameras 65, 70 to determine the location of the bullet 25 and the trajectory 27 of the bullet 25 across multiple frames.

Next, trajectory estimation occurs. First, predictive, mathematical models are used to predict the trajectory 27 of the bullet 25 based on initial conditions and known physical properties of the bullet 25. These models also consider environment factors like gravity, air resistance, and wind, which could alter the trajectory 27 of the bullet 25. Second, real-time and continuous updates to the predicted trajectory 27 occur based on the observed positions of the bullet 25 in flight as captured in the camera frames.

Then, an error correction process occurs. This involves performing a comparative analysis by comparing the predicted trajectory 27 with the observed positions of the bullet 25. Any deviations between the two indicate errors that need correction (e.g., aim adjustments 40). The adjustment algorithms calculate the necessary adjustments to correct the path for subsequent bullets 25$x$. These adjustments can involve recalculating the launch angle or force applied to the bullets 25x, for example. Next, a real-time feedback loop occurs such that real-time feedback is provided to the gunner or the aiming mechanism 31 of the weapon 30. This feedback can be in the form of visual cues or other aim adjustments 40 for the weapon 30 or gunner.

The process of generating the real-time correction calculations 75 is iterative and involves continuously monitoring and adjusting what the trajectory 27 of the bullet 25 should be in order to more accurately reach the target 35. Further enhancements are utilized to improve the accuracy. For example, spectral filtering techniques can be used to reduce false alarm detections and enhance the accuracy of positional data related to the bullet 25. Furthermore, the data 20 is integrated from the camera pods 55 including the multiple cameras 65, 70 to enhance accuracy further. Fusion algorithms combine data from various sources (e.g., cameras 65, 70) for a more comprehensive understanding of the trajectory 27 of the bullet 25. Next, latency reduction is performed using the processor 45 or another computing system to perform complex calculations quickly in order to minimize processing latency. In an alternative embodiment, the system 10 may include safety measures to prevent accidental weapon firing or unintended target selection, based on an analysis of the real-time correction calculations 75. The method 100 may further include regular testing and calibration of the system 10 to ensure the system 10 performs accurately under different conditions and environments.

As shown in FIG. 6F, the method 100 may comprise using (140) a computer stereo vision camera 80 for tracking the trajectory 27 of the bullet 25. The computer stereo vision camera 80, also referred to as a stereo camera or stereo vision system, is a specialized imaging device that mimics the human visual system's depth perception by capturing three-dimensional information from its surroundings. This technology is based on the principle of stereopsis, where the brain processes slightly different images received from each eye to perceive depth and spatial relationships. The computer stereo vision camera 80 operates on a similar concept by using two or more cameras to capture multiple perspectives of a scene.

The camera 80 may be configured as two or more cameras positioned a known distance d apart from each other, mimicking the separation of human eyes. Each camera has an image sensor (e.g., CMOS or CCD) that captures the visual data in the form of two-dimensional images. These sensors can be monochrome or color sensors. The cameras are synchronized to ensure that they capture images at the same time, minimizing time discrepancies between the views. Synchronization is crucial for accurate depth perception.

The cameras 80 capture images of the same scene from two or more slightly different viewpoints. The cameras 80 simultaneously record images, ensuring that the scenes are as closely matched in time as possible. The captured images are rectified to ensure that corresponding points in the left and right images are aligned along horizontal epipolar lines. This simplifies the depth calculation process. The camera 80 identifies common features or points of interest in both images. These points serve as reference points for depth calculation.

The difference in the positions of corresponding points in the left and right images is called disparity. By calculating the disparity for each point, the sensor sub-system 15 can determine the depth information of the scene. Larger disparities correspond to closer objects, and smaller disparities represent more distant objects. Using geometric principles, the sensor sub-system 15 triangulates the depth information based on the known separation between the cameras 80 and the disparity values. This results in the generation of a depth map or 3D point cloud that represents the scene's spatial structure. The depth map or point cloud provides depth information, enabling the sensor sub-system 15 to understand the three-dimensional layout of the scene to determine the distance to objects (e.g., bullet 25, trajectory 27, target 35, etc.) in the field of view.

Figure 6G:
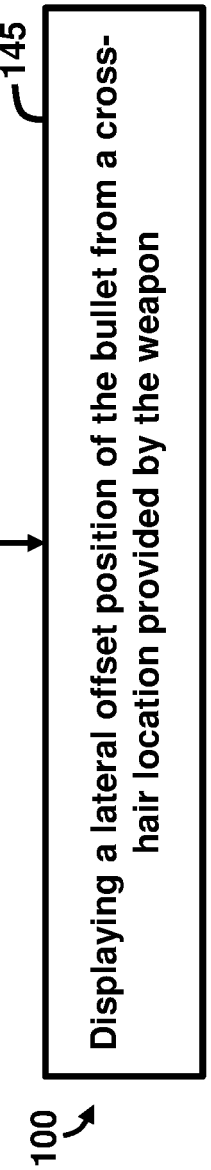
FIG. 6G is a flow diagram illustrating a method of displaying a position of a bullet, according to an embodiment herein.

As shown in FIG. 6G, the method 100 may comprise displaying (145) a lateral offset position of the bullet 25 from a cross-hair location provided by the weapon 30. The display device 85 provides real-time feedback to the gunner(s), helping them adjust their aim manually or to allow for automatic aim adjustments 40 of the weapon 30 and ensure that the bullet 25 hits the intended target 35 accurately. The system 10 provides a cross-hair location, which represents the intended point of impact of the bullet 25 on the target 35. The cross-hair is typically displayed through an optical sight or an electronic aiming system.

The processor 45 continuously calculates the trajectory 27 of the fired bullet 25 using data 20 captured from various sources, including the high-resolution color spotting camera 65 and bullet tracking cameras 70. This trajectory calculation accounts for factors like bullet speed, initial direction, wind conditions, and gravity. The method 100 compares the calculated bullet trajectory 27 with the cross-hair location and determines the lateral offset, which represents the horizontal (side-to-side) difference between where the bullet 25 is expected to hit and where the shooter/weapon 30 aimed (cross-hair location).

The display device 85 may be configured as an electronic screen, monitor, or heads-up display (HUD). This display device 85 visually conveys the lateral offset position of the bullet 25 from the cross-hair location. The calculated lateral offset may be shown as a numerical value or as a graphical overlay on the display device 85 informing the shooter how much they need to adjust their aim to compensate for the calculated error, if a manual adjustment is required. This feedback can be displayed in various formats, such as numerical offset or a visual indicator. The lateral offset may be expressed as a specific measurement, like inches or centimeters, indicating the horizontal adjustment needed. The visual indicator may be configured as an on-screen arrow, dot, or line that may guide the shooter in the direction of the required adjustment, if performing a manual aim adjustment 40.

Based on the lateral offset information displayed, the real-time aim adjustments 40 are generated, which moves the weapon 30 by aligning the cross-hair with the displayed offset information to correct the aim. As the aim adjustments 40 occur, the display device 85 continues to provide real-time feedback on the lateral offset, allowing the shooter to fine-tune their aim until the cross-hair aligns with the intended point of impact. Once the gunner is satisfied with the alignment and the displayed offset reaches a satisfactory level, the weapon 30 is fired with the subsequent bullets 25x. This process ensures that the bullets 25x are more accurately directed towards the target 35. The process of calculating the bullet trajectory 27, determining the lateral offset, and making adjustments is iterative and continues until the method 100 reaches a confidence level of the aim.

The sensor sub-system 15 is a highly advanced component within a weapon system that utilizes a combination of camera pods 55, spectral filtering, and real-time calculations to monitor and correct the trajectory 27 of the bullet 25 to improve the trajectories of subsequent bullets 25x. The ability of the sensor sub-system 15 to provide accurate feedback to the shooter ensures the highest level of precision in hitting the intended target 35, even under challenging and dynamic conditions.

In some examples, the processor 45 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a RF switch, antenna tuner, comparator, inverter, or flip-flop, which could include a plurality of transistors and other supporting devices and circuit elements. The modules that are configured with electronic circuits process and/or execute computer logic instructions capable of providing digital and/or analog signals for performing various functions as described herein including controlling the operations of the system 10 and associated components. In some examples, the processor 45 may comprise a central processing unit (CPU) of the system 10. In other examples the processor 45 may be a discrete component independent of other processing components in the system 10. In other examples, the processor 45 may be a semiconductor-based microprocessor, microcontroller, field-programmable gate array (FPGA), hardware engine, hardware pipeline, and/or other hardware-enabled device suitable for receiving, processing, operating, and performing various functions for the system 10. The processor 45 may be provided in the system 10, coupled to the system 10, or communicatively linked to the system 10 from a remote networked location, according to various examples.

The system 10 may be embodied as an electronic device according to an example. For example, the system 10 as embodied as an electronic device may comprise any suitable type of communication device capable of transceiving data. In other examples, system 10 as embodied as an electronic device may comprise a computer, all-in-one (AIO) device, laptop, notebook computer, tablet device, mobile phone, smartphone, electronic book reader, appliance, gaming system, electronic toy, web-based server, local area network server, cloud-based server, etc., among other types of electronic devices that communicate with another device wirelessly.

Furthermore, the system 10 may comprise various controllers, switches, processors, and circuits, which may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein.

The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

Various examples described herein may include both hardware and software elements. The examples that are implemented in software may include firmware, resident software, microcode, etc. Other examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device containing software code.

Figure 7A:
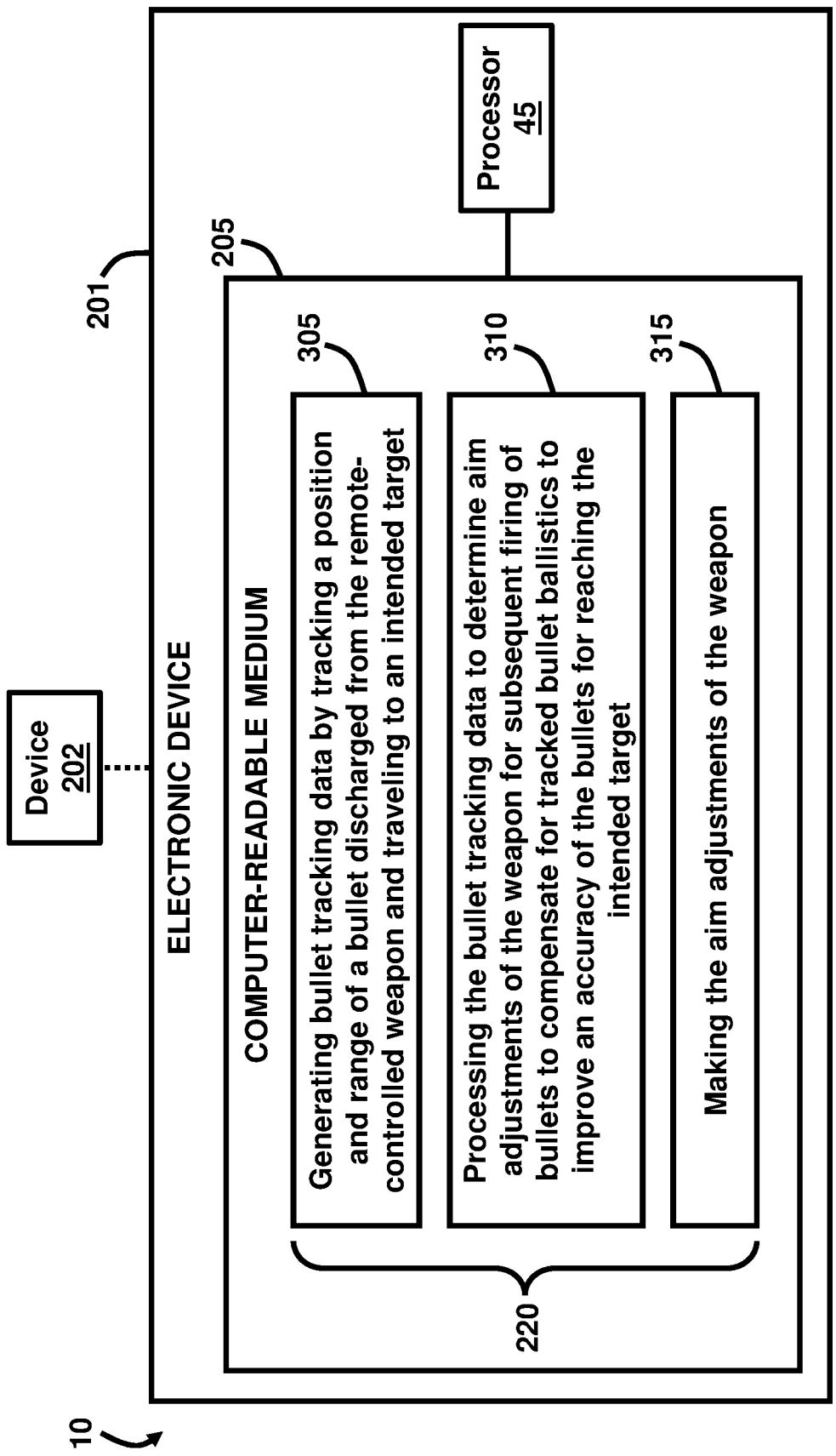
FIG. 7A is a block diagram illustrating a system executing computer-executable instructions for tracking a bullet discharged from a remote-controlled weapon, according to an embodiment herein.
Figure 7B:
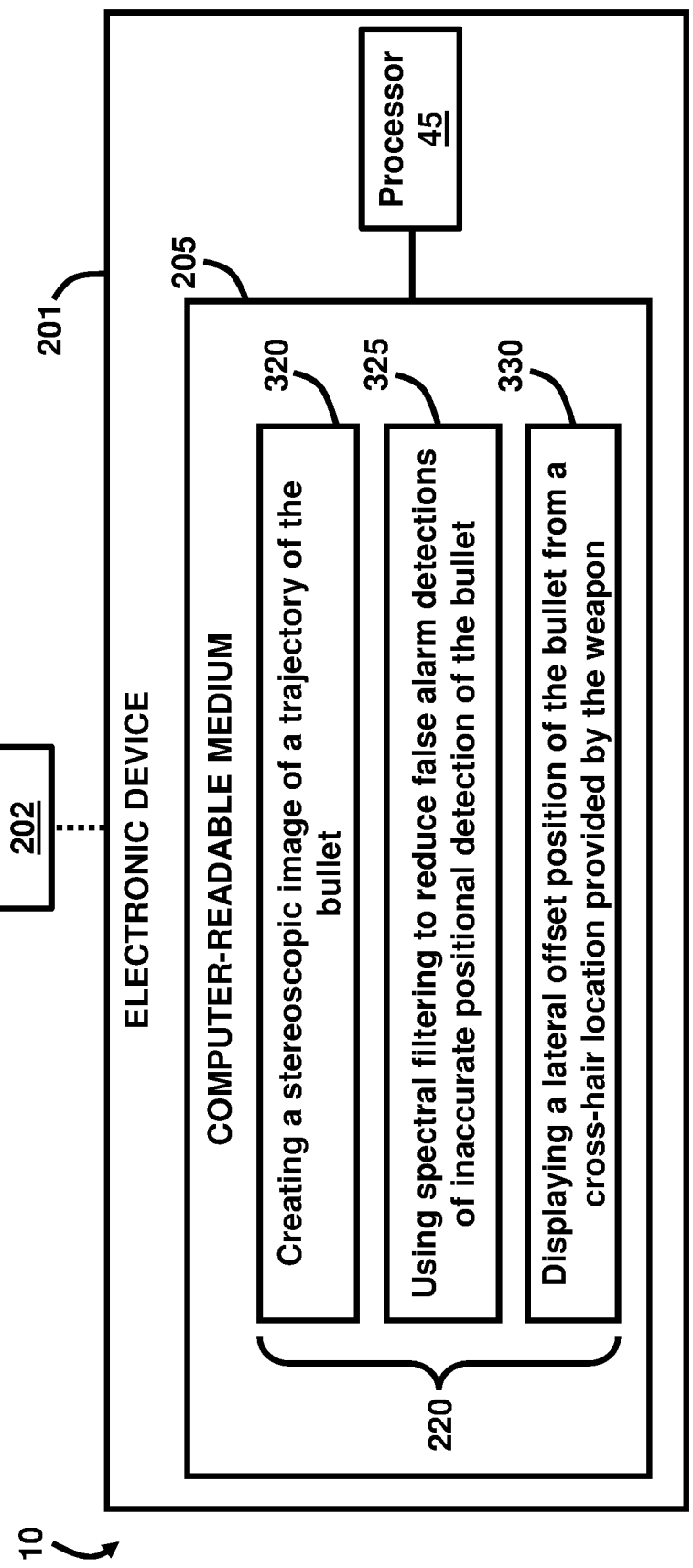
FIG. 7B is a block diagram illustrating a system further executing computer-executable instructions for tracking a bullet discharged from a remote-controlled weapon, according to an embodiment herein.

FIGS. 7A and 7B, with reference to FIGS. 1 through 6G, illustrates another example of the system 10 for tracking a bullet 25 discharged from a remote-controlled weapon 30. The system 10 comprises an electronic device 201 containing a computer-readable storage medium 205, and a remote communication device 202 communicatively linked to the electronic device 201. In the example of FIGS. 7A and 7B, the electronic device 201 includes the processor 45 and the computer-readable storage medium 205. Processor 45 may include a central processing unit, microprocessors, hardware engines, and/or other hardware devices suitable for retrieval and execution of instructions stored in a computer-readable storage medium 205. Processor 45 may fetch, decode, and execute computer-executable instructions 220 to enable execution of locally-hosted or remotely-hosted applications for controlling action of the electronic device 201. The remotely-hosted applications may be accessible on remotely-located devices; for example, the remote communication device 202. For example, the remote communication device 202 may be a laptop computer, tablet device, smartphone, or notebook computer. As an alternative or in addition to retrieving and executing instructions, processor 45 may include electronic circuits including a number of electronic components for performing the functionality of the computer-executable instructions 220.

The computer-readable storage medium 205 may be any electronic, magnetic, optical, or other physical storage device that stores executable instructions. Thus, the computer-readable storage medium 205 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the computer-readable storage medium 205 may include a non-transitory computer-readable storage medium 205. The computer-readable storage medium 205 may be encoded with executable instructions for enabling execution of remotely-hosted applications accessed on the remote communication device 202. In an example, the processor 45 of the electronic device 201 executes the computer-executable instructions 220 that when executed cause the electronic device 201 to perform computer-executable instructions 230-276.

As shown in FIG. 7A, the computer-readable medium 205 is configured for storing instructions 220 for tracking a bullet 25 discharged from a remote-controlled weapon 30, the instructions 220 comprising generating (305) bullet tracking data 20 by tracking a position and range of a bullet 25 discharged from the remote-controlled weapon 30 and traveling to an intended target 35; processing (310) the bullet tracking data 20 to determine aim adjustments 40 of the weapon 30 for subsequent firing of bullets 25x to compensate for tracked bullet ballistics to improve an accuracy of the bullets 25x for reaching the intended target 35; and making (315) the aim adjustments 40 of the weapon 30.

As shown in FIG. 7B, the various blocks are not necessarily sequential and may be practiced independent from each other and/or in any suitable order. As indicated in FIG. 7B, the instructions 220 may comprise creating (320) a stereoscopic image 60 of a trajectory 27 of the bullet 25. The instructions 220 may comprise using (325) spectral filtering to reduce false alarm detections of inaccurate positional detection of the bullet 25. The instructions 220 may comprise displaying (330) a lateral offset position of the bullet 25 from a cross-hair location provided by the weapon 30. The processes directed to the instructions 220 are further described above with reference to method 100.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions 220 include, for example, instructions and data which cause a special purpose computer or special purpose processing device to perform a certain function or group of functions. Computer-executable instructions 220 also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions 220, associated data structures, and program modules represent examples of the program code means for executing steps of the methods disclosed herein. The particular sequence of such executable instructions 220 or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, including advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
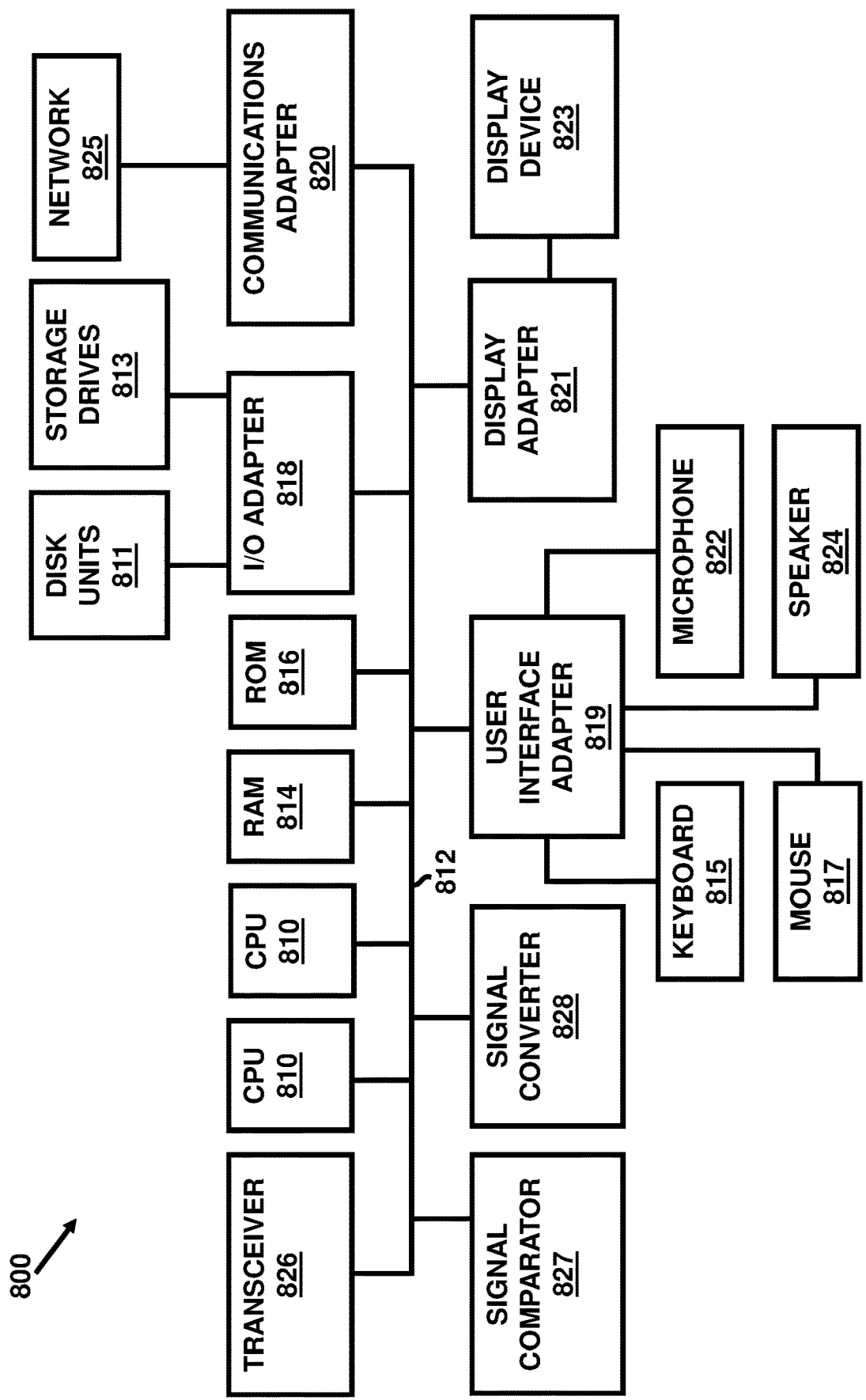
FIG. 8 is a block diagram illustrating a computer system, according to an embodiment herein.

A representative hardware environment for practicing the embodiments herein is depicted in FIG. 8, with reference to FIGS. 1 through 7B. This schematic drawing illustrates a hardware configuration of an information handling/computer system 800 in accordance with the embodiments herein. The system 800 comprises at least one processor or central processing unit (CPU) 810. The CPUs 810 are interconnected via system bus 812 to various devices such as a random access memory (RAM) 814, read-only memory (ROM) 816, and an input/output (I/O) adapter 818. The I/O adapter 818 can connect to peripheral devices, such as disk units 811 and tape drives 813, or other program storage devices that are readable by the system. In another example, any of the cameras 65, 70, 80 may be operatively connected to the I/O adapter 818. The system 800 can read the inventive instructions 220 on the program storage devices and follow these instructions to execute the methodology of the embodiments herein. The system 800 further includes a user interface adapter 819 that connects a keyboard 815, mouse 817, speaker 824, microphone 822, and/or other user interface devices such as a touch screen device (not shown) to the bus 812 to gather user input. Additionally, a communication adapter 820 connects the bus 812 to a data processing network, and a display adapter 821 connects the bus 812 to a display device 823 which may be embodied as an output device such as a monitor, printer, or transmitter, for example. Further, a transceiver 826, a signal comparator 827, and a signal converter 828 may be connected with the bus 812 for processing, transmission, receipt, comparison, and conversion of electric or electronic signals.

The bullet tracking system 10 and method 100 provide for improved accuracy by continuously adjusting and improving the aim of the weapon 30 based on the actual bullet trajectories 27. This significantly enhances the accuracy of long-range or challenging shots. Moreover, the bullet tracking system 10 and method 100 can adapt to changing environmental conditions and other external factors, making the system 10 suitable for various operational scenarios. Furthermore, the bullet tracking system 10 and method 100 can provide for increased target hit probability. In this regard, the ability of the system 10 to compensate for bullet ballistics improves the chances of hitting targets 35, especially at extended ranges. Accordingly, the bullet tracking system 10 and method 100 represents a cutting-edge technology that combines sensor capabilities, sophisticated processing, and precise control mechanisms to enhance the accuracy and effectiveness of remote-controlled weapons 30. The integration of the bullet tracking system 10 and method 100 enables precise targeting and efficient engagement of intended targets 35 under dynamic operational conditions.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A bullet tracking system comprising:
a sensor sub-system that generates bullet tracking data by tracking a position and range of a bullet discharged from a remote-controlled weapon and traveling to an intended target;
a processor that processes the bullet tracking data to determine aim adjustments of the weapon for subsequent firing of bullets to compensate for tracked bullet ballistics to improve an accuracy of the bullets for reaching the intended target;
a control sub-system to make the aim adjustments of the weapon;
wherein the sensor sub-system comprises a plurality of camera pods separated by a predetermined distance to create a stereoscopic image of a trajectory of the bullet;
wherein each camera pod comprises a high-resolution color spotting camera and high, mid, and low-resolution bullet tracking cameras.

2. The system of claim 1, wherein the bullet tracking cameras use spectral filtering to reduce false alarm detections of inaccurate positional detection of the bullet.

3. The system of claim 1, wherein the sensor sub-system performs near real-time correction calculations for bullet trajectories and camera synchronization.

4. The system of claim 1, wherein the sensor sub-system comprises a computer stereo vision camera.

5. The system of claim 1, comprising a display device that displays a lateral offset position of the bullet from a crosshair location provided by the weapon.

6. A method for tracking a bullet discharged from a remote-controlled weapon, the method comprising:
generating bullet tracking data by tracking a position and range of a bullet discharged from the remote-controlled weapon and traveling to an intended target;
processing the bullet tracking data to determine aim adjustments of the weapon for subsequent firing of bullets to compensate for tracked bullet ballistics to improve an accuracy of the bullets for reaching the intended target;
making the aim adjustments of the weapon;
creating a stereoscopic image of a trajectory of the bullet using a plurality of camera pods separated by a predetermined distance;
wherein each camera pod comprises a high-resolution color spotting camera and high, mid, and low-resolution bullet tracking cameras.

7. The method of claim 6, comprising using spectral filtering to reduce false alarm detections of inaccurate positional detection of the bullet.

8. The method of claim 6, comprising performing near real-time correction calculations for bullet trajectories and camera synchronization.

9. The method of claim 6, comprising using a computer stereo vision camera for tracking the trajectory of the bullet.

10. The method of claim 6, comprising displaying a lateral offset position of the bullet from a cross-hair location provided by the weapon.

\* \* \* \* \*